United States Patent
Murata et al.

(10) Patent No.: US 6,941,908 B2
(45) Date of Patent: Sep. 13, 2005

(54) INTERNAL COMBUSTION ENGINE

(75) Inventors: Shinichi Murata, Okazaki (JP); Yusaku Saito, Kyoto (JP); Norihiko Kaneko, Kyoto (JP); Takehiko Ogasahara, Kyoto (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 0 days.

(21) Appl. No.: 10/927,093

(22) Filed: Aug. 27, 2004

(65) Prior Publication Data

US 2005/0056242 A1 Mar. 17, 2005

(30) Foreign Application Priority Data

Aug. 28, 2003 (JP) .......................................... 2003-305101

(51) Int. Cl.[7] ................................................ F01L 1/34
(52) U.S. Cl. ................................ 123/90.15; 123/90.16; 123/90.17; 123/90.31
(58) Field of Search .......................... 123/90.15, 90.17, 123/90.31, 90.16; 60/284, 274, 285

(56) References Cited

U.S. PATENT DOCUMENTS

| | | | |
|---|---|---|---|
| 5,230,317 A | * | 7/1993 | Nonogawa et al. ......... 123/432 |
| 6,390,869 B2 | * | 5/2002 | Korenjak et al. .......... 440/88 R |
| 6,439,184 B1 | * | 8/2002 | Takenaka et al. ........ 123/90.17 |
| 6,637,386 B2 | | 10/2003 | Murata et al. |
| 6,837,040 B2 | * | 1/2005 | Sonoda et al. ................. 60/284 |

FOREIGN PATENT DOCUMENTS

JP 2002-155767 A 5/2002

* cited by examiner

*Primary Examiner*—Thomas Denion
*Assistant Examiner*—Zelalem Eshete
(74) *Attorney, Agent, or Firm*—Birch Stewart Kolasch & Birch LLP

(57) ABSTRACT

An engine includes, a cylinder head, an intake valve, an exhaust valve, and a first clearance adjusting mechanism for actuating the intake valve. The first clearance adjusting mechanism (1) maintains a first valve clearance when the intake valve and the cylinder head are in a cold state, such that the intake valve closes after a bottom dead center, and (2) maintains a second valve clearance, shorter than the first valve clearance, when a temperature of the intake valve is in a hot state and a temperature of the cylinder head is still in the cold state, after a cold start of the engine, such that an open timing of the intake valve is advanced and a close timing of the intake valve is retarded. The exhaust valve opens and closes at fixed predetermined timings regardless of a temperature of the exhaust valve and the cylinder head.

10 Claims, 5 Drawing Sheets

INTERNAL COMBUSTION ENGINE

CROSS REFERENCE TO RELATED APPLICATION

This non-provisional application incorporates by reference the subject matter of Application No. 2003-305101 filed in Japan on Aug. 28, 2003, on which a priority claim is based under 35 U.S.C. § 119(a).

BACKGROUND OF THE INVENTION (1) Field of the Invention

The present invention relates to an internal combustion engine provided with a valve mechanism.

(2) Description of the Related Art

Automobiles have been required to reduce unburned components of fuel, which are included in an exhaust gas. Accordingly, it has been proposed that an automobile is provided with an exhaust gas purifying catalyst disposed in an exhaust pipe to detoxify unburned components in the exhaust gas. To effectively use the exhaust gas purifying catalyst, it is necessary to increase the temperature of the exhaust gas purifying catalyst until it is activated. Thus, in a cold state, e.g., immediately after the start of an automobile, it is difficult to activate the exhaust gas purifying catalyst since the temperature of the exhaust gas is not high.

On the other hand, there has been known a method in which the phase of the opening timing of an intake valve and an exhaust valve is shifted to control the overlap during opening of those valves, so that unburned components in the exhaust gas can be reduced when an engine is cold. According to Japanese Laid-Open Patent Publication (Kokai) No. 2002-155767, the opening timing of an intake valve is advanced from the top dead center of a piston to increase the quantity of an exhaust gas which flows back into an intake port and is combusted again (internal EGR gas), so that unburned fuel in the exhaust gas is combusted, and the temperature of the intake port is increased due to heat of the exhaust gas to facilitate the carburetion of fuel which is injected next so that unburned components in the exhaust gas can be reduced.

However, according to the above conventional method in which the overlap is controlled, if one of an opening timing and a closing timing is determined, the other is uniquely determined. Therefore, if the opening timing of the intake valve is advanced, the closing timing thereof is also advanced, which reduces the quantity of air-fuel mixture which is heated in a cylinder and flows back into the intake port, and inhibits the facilitation of fuel injected next and the combustion of fuel in an air-fuel mixture. Namely, it is impossible to efficiently reduce unburned components of fuel since the opening timing and the closing timing of the intake valve cannot be determined independently of each other.

SUMMARY OF THE INVENTION

The present invention provides an internal combustion engine that includes: a cylinder head; an intake valve slidably supported by the cylinder head; an exhaust valve slidably supported by the cylinder head; a first clearance adjusting mechanism for actuating the intake valve, the first clearance adjusting mechanism (a) maintaining a first valve clearance when the engine is in a first state, where both the intake valve and the cylinder head are in a cold state, such that the intake valve closes after a bottom dead center, and (b) maintaining a second valve clearance, shorter than the first valve clearance, when the engine is in a second state, where a temperature of the intake valve is in a hot state and a temperature of the cylinder head is still in the cold state, after a cold start of the engine, such that an open timing of the intake valve is advanced and a close timing of the intake valve is retarded; and a second clearance adjusting mechanism for actuating the exhaust valve, the second clearance adjusting mechanism opens and closes the exhaust valve at fixed predetermined timings regardless of a temperature of the exhaust valve and the cylinder head.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein:

FIG. 2(*b*) is a front view showing a valve clearance of the intake valve in a second cold state for some time after the start of the internal combustion engine according to the first and second embodiments;

FIG. 2(*c*) is a front view showing a valve clearance of the intake valve in a hot state according to the first and second embodiments;

FIG. 3(*b*) is a front view showing a valve clearance of the exhaust valve in the second cold state for some time after the start of the internal combustion engine according to the first and second embodiments;

FIG. 3(*c*) is a front view showing a valve clearance of the exhaust valve in a hot state according to the first and second embodiments;

DETAILED DESCRIPTION OF THE INVENTION

The present invention will now be described in detail with reference to the accompanying drawings showing embodiments thereof. It is to be understood, however, that the dimensions, materials, shapes, and arrangements of component parts should not be restricted to the following embodiments, but changes within the purview of the appended claims may be made without departing from the true scope.

Figure 1:
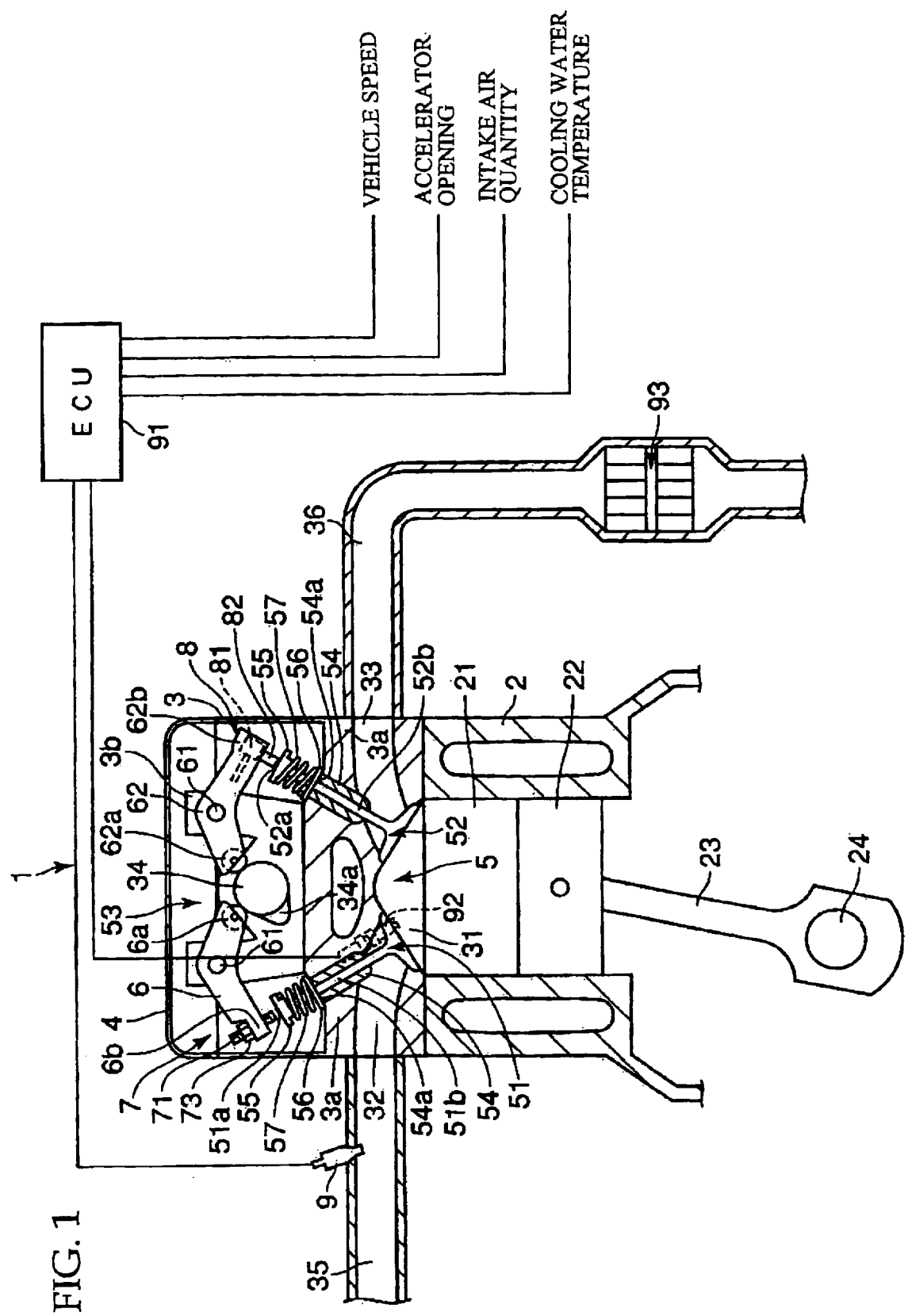
FIG. 1 is a sectional view showing an internal combustion engine according to first and second embodiments of the present invention.

A description will now be given of an internal combustion engine according to a first embodiment of the present invention with reference to FIGS. 1 to 4. As shown in FIG. 1, the internal combustion engine is, for example, a reciprocating gasoline engine 1 for an automobile. The engine 1 includes a cylinder block 2, a cylinder head 3, and a cylinder head cover 4.

The cylinder block 2 has a cylinder 21 incorporated therein, and is configured such that a piston 22 slides within the cylinder 21. It should be noted that the engine 1 is a four cycle engine of a straight four cylinder type, which is provided with four cylinders 21 and four pistons 22. Each of the pistons 22 is connected to a crankshaft 24 via a connecting rod 23, and the sliding motion of each of the pistons 22 is transformed into the rotary motion of the crankshaft 24.

The cylinder head 3 is connected to one end of the cylinder block 2, which defines the cylinder 21, and is provided with a combustion chamber 31 connected to the cylinder 21. The cylinder head 3 is provided with an intake port 32 which is connected to the combustion chamber 31 and into which an air-fuel mixture generated by mixture of e.g., air and fuel flows, and an exhaust port 33 which is connected to the combustion chamber 31 and into which combustion gas generated by combustion of e.g., an air-fuel mixture taken into the composition chamber 31. The engine 1 also includes a valve system 5 which is provided in the interior of the combustion chamber 31, for taking in an air-fuel mixture and emitting exhaust gas.

The valve system 5 comprises an intake valve 51 which opens and closes the intake port 32, an exhaust valve 52 which opens and closes the exhaust port 33, and a valve mechanism 53 which opens and closes the intake valve 51 and the exhaust valve 52 and sets an opening timing and a closing timing thereof to the optimum. It should be noted that valve opening is a state in which the intake valve 51 or the exhaust valve 52 is pushed down to connect the combustion chamber 31 to the intake port 32 or the exhaust pipe 33, and valve closing is a state in which the intake valve 51 or the exhaust valve 52 is pushed up from an opened state to disconnect the intake port 32 or the exhaust port 33 from the combustion chamber 31.

Each of the intake valve 51 and the exhaust valve 52 is slidably supported by a valve guide 54. The valve guide 54 is provided such that respective stem ends 51a and 52a thereof are exposed from a thickness portion 3a. The intake valve 51 and the exhaust valve 52 are configured such that a valve spring retainer 55 is mounted in the vicinity of each of the respective stem ends 51a and 52a, and a valve spring sheet 56 are mounted at a stem end side one end 54a of the valve guide 54, and a valve spring 57 is mounted between the valve spring retainer 55 and the valve spring sheet 56. With this arrangement, the intake valve 51 and the exhaust valve 52 are pushed up due to operation of the valve spring 57, and are therefore normally closed.

The valve mechanism 53 is intended to open and close the intake valve 51 and the exhaust valve 52 by using a rotational force of the crankshaft 24, and is based on the SOHC (Single Overhead Camshaft) method, for example. The valve mechanism 53 comprises a camshaft 34, a cam 34a, an intake side rocker arm 6 (intake side driving part), an exhaust side rocker arm 62 (exhaust side driving part), a screw-type clearance adjusting mechanism 7 (fixed type clearance adjusting mechanism), a hydraulic lash adjuster 8 (automatic clearance adjusting mechanism), and so forth.

A crankshaft pulley, not shown, fixed to one end of the crankshaft 24, and a camshaft pulley, not shown, fixed to one end of the camshaft 34 rotatably supported by a boss 3b of the cylinder head 3 are connected to each other via a timing belt, not shown, such that a rotational force of the crankshaft 24 is transmitted to the camshaft 34.

Also, the intake side rocker arm 6 which drives the intake valve 51 by a rotational force of the camshaft 34 is attached to the boss 3b. Substantially the center of the intake side rocker arm 6 is supported by a rocker shaft 61 such that it is rotatable about the rocker shaft 61. A cam side end 6a of the intake side rocker arm 6 comes into contact with the cam 34a of the camshaft 34, and a valve side end 6b of the intake side rocker arm 6 comes into contact with the stem end 51a of the intake valve 51. With the rotation of the camshaft 34, the cam 34a pushes up the cam side end 6a of the intake side rocker arm 6, and then the valve side end 6b of the intake side rocker arm 6 pushes down the intake valve 51 about the rocker shaft 61 as a fulcrum to open the intake valve 51.

The exhaust side rocker arm 62 which drives the exhaust valve 52 is supported by the boss 3b as is the case with the intake side rocker arm 6, and the exhaust valve 52 is opened in the same manner as the intake valve 51.

Figure 2:
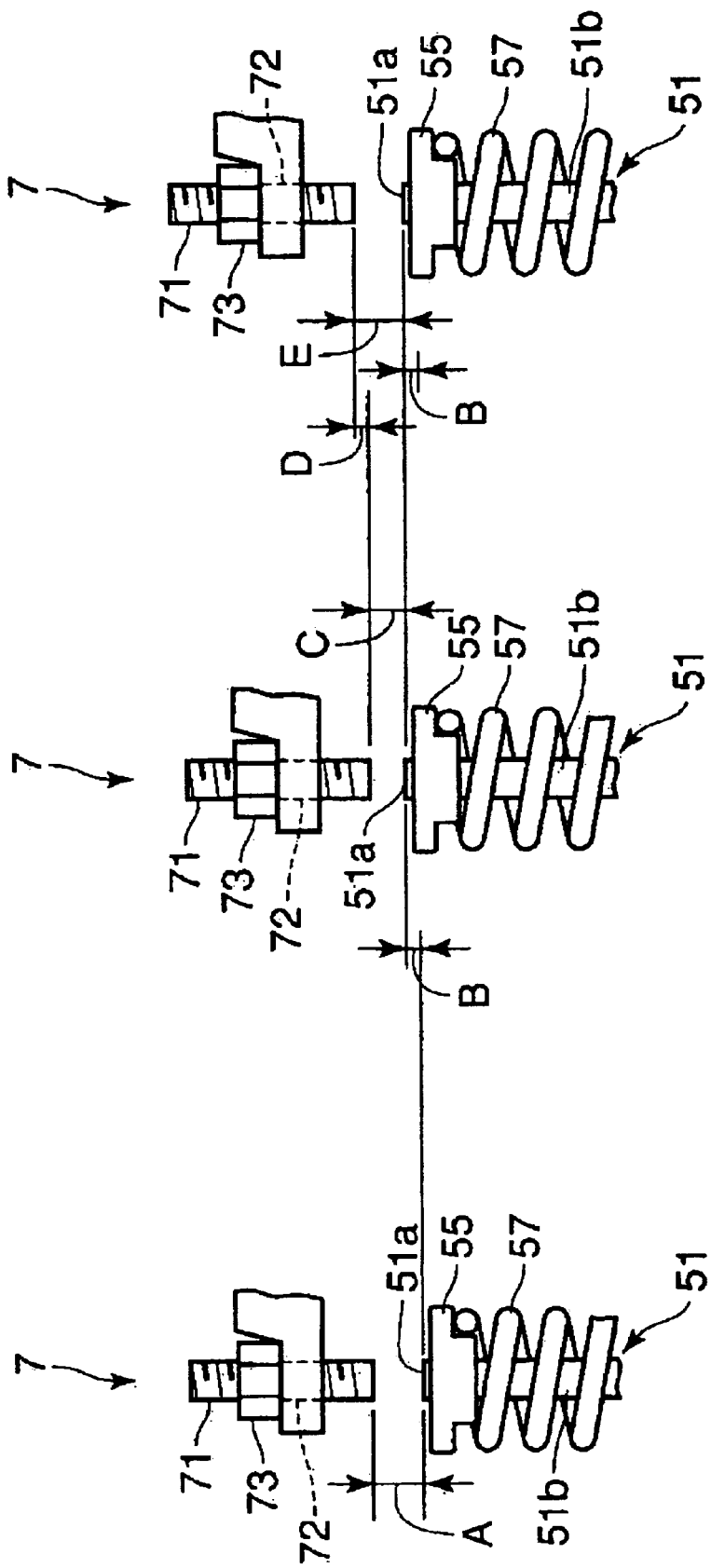
FIG. 2(*a*) is a front view showing a valve clearance of an intake valve in a first cold state according to the first and second embodiments.

A valve clearance formed between the valve side end 6b of the intake side rocker arm 6 and the stem end 51a of the intake valve 51 is set to a predetermined value other than zero by the screw type clearance adjusting mechanism 7 via an adjusting screw 71, for example. As shown in FIG. 2, the screw type clearance adjusting mechanism 7 is formed with a screw hole 72 passing through the valve side end 6b of the intake side rocker arm 6, and the adjusting screw 71 is engaged with the screw hole 72. The screw type clearance adjusting mechanism 7 sets the valve clearance by adjusting the amount of protrusion of the adjusting screw 71 from the valve side end 6b of the intake side rocker arm 6 toward the intake valve 51. The adjusting screw 71 is fastened by a nut 73 when the valve clearance is completely set. It should be noted that the valve clearance is set to such a value that the stem end 51a of the intake valve 51 does not come into contact with the adjusting screw 71 even if the stem end 51b of the intake valve 51 extends due to thermal expansion.

Figure 3:
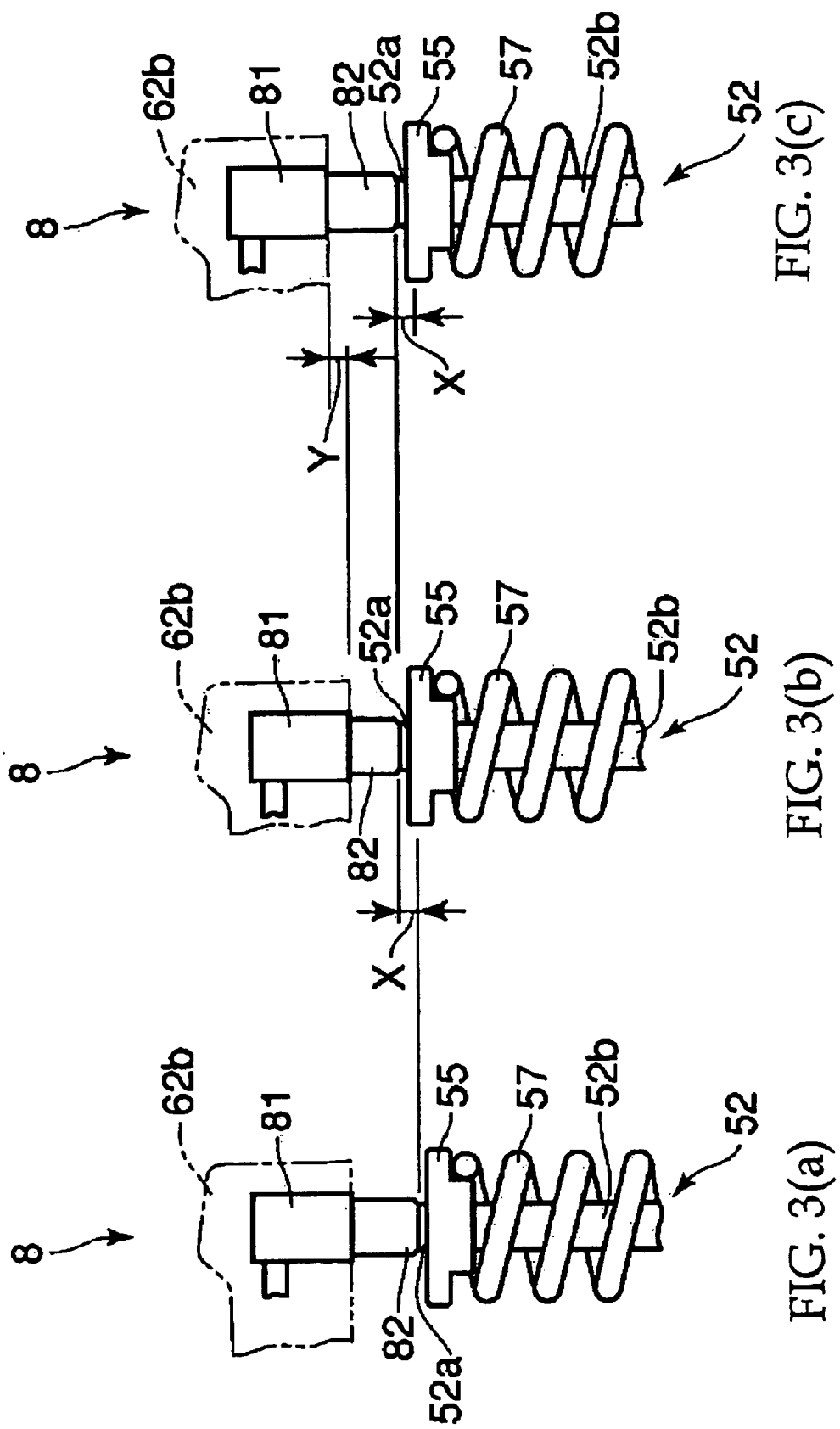
FIG. 3(*a*) is a front view showing a valve clearance of an exhaust valve in the first cold state according to the first and second embodiments.

As shown in FIG. 3, the hydraulic lash adjuster 8 is attached to a valve side end 62b of the exhaust side rocker arm 62 to prevent formation of a valve clearance between the valve side end 62b and the stem end 52a of the exhaust valve 52. The hydraulic lash adjuster 8 comprises a main body 81 and a plunger 82, which has one end thereof in contact with the stem end 52a of the exhaust valve 52. The plunger 82 is hydraulically actuated, and is not displaced relative to the main body 81 when load is instantaneously applied to the plunger 82 as in the case of opening and closing of the exhaust valve 52. The plunger 82 is pushed up in response to e.g., such a load as to push up the plunger 82 for a long period of time due to thermal expansion of the stem end 52b of the exhaust valve 52. Therefore, no valve clearance is formed between the stem end 52a of the exhaust valve 52 and the valve side end 62b of the exhaust side rocker arm 62, i.e., the plunger 82. Thus, the hydraulic lash adjuster 8 keeps the valve clearance, which is formed between the stem end 52a of the exhaust valve 52 and the valve side end 62b of the exhaust side rocker arm 62, at substantially zero.

The cylinder head cover 4 is connected to the cylinder head 3 in such a way as to cover the boss 3b within the cylinder head 3 and the valve system 5.

The intake port 32 is connected to an intake passage 35. In the exhaust passage 35, an injector 9, which injects fuel into the intake passage, is mounted in the vicinity of the intake port 32. The injector 9 is connected to an ECU 91 that controls fuel injection.

The ECU 91 controls the injector 9 by determining the condition of the automobile such as the condition of the engine 1 according to vehicle speed, accelerator opening, intake air quantity, cooling water temperature, and so forth. As a result, the air which has passed through the intake passage 35 and the fuel injected from the injector 9 form an air-fuel mixture suitable for the condition of the automobile. The ECU 91 also makes lean the air-fuel ratio of the air-fuel mixture (making-lean means).

An ignition plug 92 is attached to the combustion chamber 31. The ignition plug 92 is connected to the ECU 91 which controls an ignition timing. The ECU 91 also retards ignition timing (retarding means).

The exhaust port 33 is connected to an exhaust passage 36, downstream of which an exhaust gas purifying catalyst 93 for purifying exhaust gas is disposed.

A description will now be given of the operation of the valve system 5 with reference to FIGS. 2 to 4. A state in which the engine 1 is cold before the driver starts the engine 1 is defined as a first cold state of the engine 1. The valve clearance of the intake valve 51 in the first cold state is denoted by A in FIG. 2(a). The valve clearance A is about 0.2 mm, for example, which is the initial value of the valve clearance in a state in which neither the intake valve 51 nor the cylinder head 3 is thermally expanded. In this state, as shown in FIG. 3(a), the exhaust valve 52 is not thermally expanded, neither. The valve clearance of the exhaust valve 52 is substantially zero due to the adoption of the hydraulic lash adjuster 8.

A hot state of the engine 1 is a state in which the intake valve 51, the exhaust valve 52, and the cylinder head 3 are thermally expanded due to heat generated by combustion of an air-fuel mixture. It should be noted that the air-fuel mixture combusted on this occasion includes, e.g., unburned components in an exhaust gas, which are blown back and taken into the intake port 32 again.

In the hot state of the engine 1, the stem end 51b of the intake valve 51 extends by an amount B due to thermal expansion as shown in FIG. 2(c). The amount of extension B of the stem end 51b is about 0.05 mm, for example. Also, the cylinder head 3 extends by an amount D e.g., in the axial direction of the intake valve 51 due to thermal expansion. The amount of extension D of the cylinder head 3 is about 0.05 mm, for example. Namely, the intake valve 51 has a valve clearance E in the hot state of the engine 1. The valve clearance E is substantially the same as the initial value A since the amount of extension B and the amount of extension D offset each other.

In the hot state of the engine 1, even on the exhaust side, the cylinder head 3 extends by an amount Y in the axial direction of the exhaust valve 52, and the stem end 52b of the exhaust valve 52 extends by an amount X as shown in FIG. 3(c), but the valve clearance of the exhaust valve 52 is substantially zero due to the adoption of the hydraulic lash adjuster 8.

Figure 4:
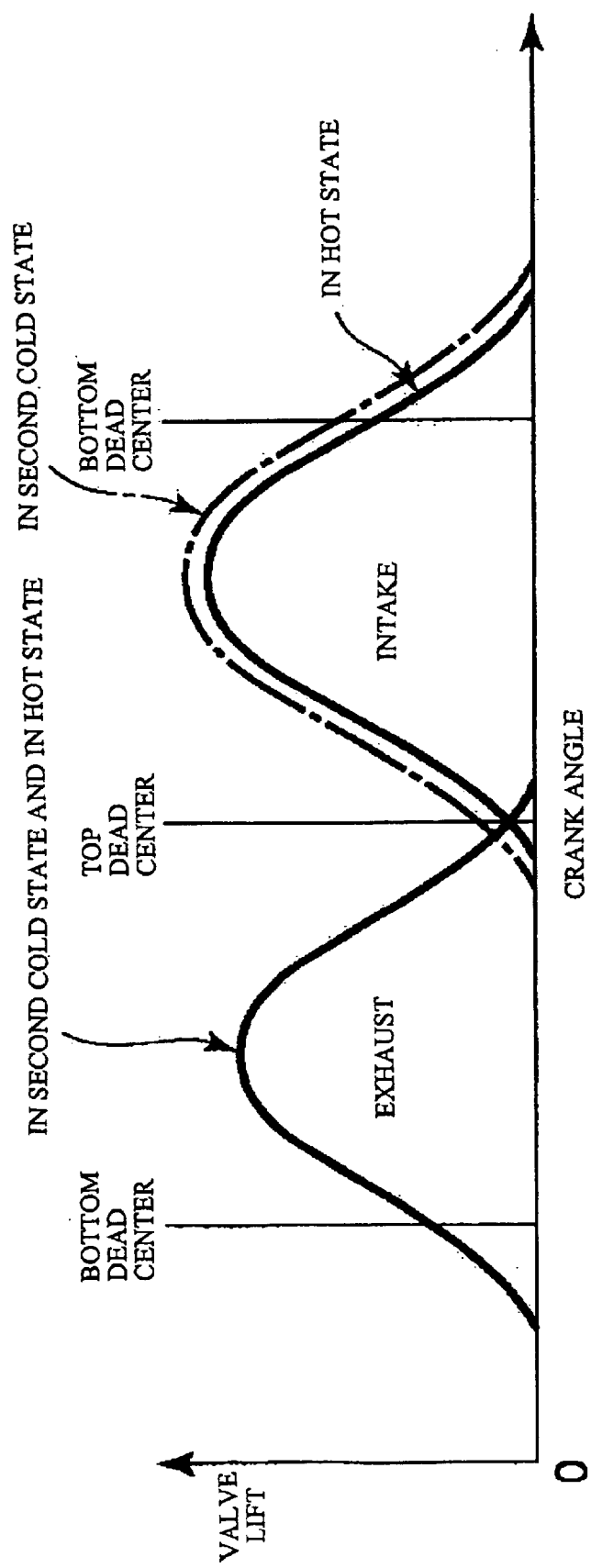
FIG. 4 is a time chart showing an opening timing and a closing timing of the intake valve and the exhaust valve according to the first embodiment.

Since the valve clearance E of the intake valve 51 in the hot state of the engine 1 is substantially the same as the initial value A, the opening and closing timing of the intake valve 52 in the hot state are the same as in the first cold state as indicated by a solid line in FIG. 4. Also, since the valve clearance of the exhaust valve 52 in the hot state of the engine 1 is substantially zero as in the first cold state, the opening and closing timing of the intake valve 52 in the hot state are the same as in the first cold state as indicated by a solid line in FIG. 4.

It should be noted that the opening and closing timing of the intake valve 51 and the exhaust valve 52 in the hot state of the engine 1 are optimum timing for reducing unburned components in exhaust gas in the hot state of the engine 1.

The opening timing of the intake valve 51 in the hot state of the engine 1 (refer to the solid line in FIG. 4) is set to a timing which is advanced e.g., about 10 degrees in crank angle relative to the top dead center of the piston 22, and lies in the upward moving stroke of the piston 22.

The closing timing of the intake valve 51 in the hot state of the engine 1 (refer to the solid line in FIG. 4) is set to a timing which is retarded e.g., about 50 degrees in crank angle relative to the bottom dead center of the piston 22, and lies in the upward moving stroke of the piston 22. Specifically, the closing timing of the intake valve 51 in the hot state of the engine 1 lies in, for example, a transitional period in the intake stroke during the upward movement of the piston 22 from a timing in which an air-fuel mixture is taken into the cylinder 21 due to the inertia of flow of intake air to a timing in which the taken-in mixture is blown back into the intake port 32 as the piston 22 moves upward. It should be noted that the closing timing of the intake valve 51 in the hot state of the engine 1 may be a timing in which an air-fuel mixture is blown back into the intake port 32.

The opening timing of the exhaust valve 52 in the hot state of the engine 1 (refer to the solid line in FIG. 4) is set to a timing which is advanced e.g., about 50 degrees in crank angle relative to the bottom dead center of the piston 22. This is because, if the exhaust valve 52 is opened before the piston 22 reaches the bottom dead center in an expansion stroke, combustion gas can be not only used for expansion, but can be emitted as exhaust gas at a high temperature, and this quickly increases the temperature of the exhaust gas purifying catalyst 93.

The closing timing of the exhaust valve 52 in the hot state of the engine 1 (refer to the solid line in FIG. 4) is set to a timing which is retarded e.g., about 10 degrees in crank angle relative to the top dead center of the piston 22. Therefore, the opening timing of the intake valve 51 and the opening timing of the exhaust valve 52 form an overlap across the top dead center of the piston during the upward movement and the downward movement of the piston 22.

When a driver of the vehicle starts the engine 1, in an intake stroke, an air-fuel mixture is taken into the combustion chamber 31 as the piston 22 moves downward, and the ignition plug 92 ignites the air-fuel mixture. For some time after the start of the engine 1, only the intake valve 51 and the exhaust valve 52, which are more likely to receive heat than the cylinder head 3, thermally expand due to combustion of the air-fuel mixture, and the respective stem ends 51b and 52b of the intake and exhaust valve 51 and 52 extend. This is defined as a second cold state of the engine 1.

In the second cold state which is for some time after the start of the engine 1, the stem end 51b of the intake valve 51 extends by the amount B as shown in FIG. 2(b). The amount of extension B of the stem end 51b is about 0.05 mm, for example. As a result, the intake valve 51 has a valve clearance C. The valve clearance C is about 0.15 mm, for example, which is less than the initial value A.

In the second cold state, the stem end 51b of the exhaust valve 52 extends by the amount X as shown in FIG. 3(b), but the valve clearance of the exhaust valve 52 is kept at substantially zero due to the adoption of the hydraulic lash adjuster 8, and the opening timing and the closing timing of the exhaust valve 52 are substantially the same as those in the hot state of the engine 1 (refer to the solid line in FIG. 4).

The opening timing and closing timing of the intake valve 51 in the second cold state, which is for some time after the start of the engine 1, are indicated by a chain line in FIG. 4. Due to a decrease in the valve clearance, the stem end 51a of the intake valve 51 comes into contact with the adjusting screw 71 of the screw type clearance adjusting mechanism 7 in an earlier timing when the cam 34a pushes up the cam side end 6a of the intake side rocker arm 6. Therefore, the opening timing of the intake valve 51 is advanced about 5 degrees in crank angle as compared with that in the hot state of the engine 1 (refer to the solid line in FIG. 4). The advancement of the opening timing of the intake valve 51 increases the overlap between the opening timing of the intake valve 51 and the opening timing of the exhaust valve 52 during the upward movement of the piston 22. Specifically, an increasing amount of exhaust gas including unburned components which are increased in the last half of an exhaust stroke is blown back into the intake port 32 and the intake passage 35 due to the negative pressure of intake air and with the upward movement of the piston 22.

At the same time, the stem end 51a of the intake valve 51 and the adjusting screw 71 are brought out of contact with each other in a later timing. Therefore, the closing timing of the intake valve 51 is retarded e.g., about 5 degrees in crank angle as compared with that in the hot state of the engine 1 (refer to the solid line in FIG. 4). The retard of the closing timing of the intake valve 51 causes taken-in air-fuel mixture (including exhaust gas partially taken in after being blown back into the intake port 32) to be blown back into the intake port 32 as the piston 22 moves upward. The taken-in mixture is increased in temperature within the cylinder 21 and the combustion chamber 31 which have been increased in temperature due to repeated combustion. Therefore, the blown-back air-fuel mixture increases the temperature of an air-fuel mixture which is taken in next, and increases the temperature of respective walls of the intake port 32 and the intake passage 35. This facilitates the carburetion of fuel which is injected next. It should be noted that, in the case where the closing timing of the intake valve 51 lies in a period of time for which an air-fuel mixture is blown back in the hot state of the engine 1, the amount of blown-back mixture is increased.

Further, since the period of time for which the stem end 51a of the intake valve 51 and the adjusting screw 71 are in contact with each other is increased due to a decrease in the valve clearance, the percentage of cam lift of the cam shaft 34 which is transformed into a valve lift is increased, and therefore, the valve lift is increased. Namely, the amount of mixture which is taken in is increased, and the quantity of thermal energy generated by fuel combustion is increased.

The ECU 91 (making-lean means and retarding means) keeps the air-fuel ratio of air-fuel mixture lean by controlling the quantity of fuel injected by the injector 9 in the second cold state which is for some time after the start of the engine 1. This increases the temperature of exhaust gas so that the temperature of the exhaust gas purifying catalyst 93 can be increased quickly. Also, the ECU 91 increases the temperature of exhaust gas by retarding the ignition timing of the ignition plug 92, so that the temperature of the exhaust gas purifying catalyst 93 can be increased quickly.

Then, when some time has passed after the start of the engine 1, the engine 1 is brought into the hot state due to an increase in temperature caused by combustion of the air-fuel mixture. In the hot state of the engine 1, the cylinder head 3 as well as the intake valve 51 and the exhaust valve 52 thermally expands. In the hot state of the engine 1, the exhaust gas purifying catalyst 93 has been sufficiently increased in temperature, and hence the ECU 91 may omit keeping the air-fuel ratio of the air-fuel mixture lean and retarding ignition timing.

In the hot state of the engine 1, the intake valve 51 and the exhaust valve 52 have the above stated valve clearances as shown in FIG. 2(c) and FIG. 3(c). The opening timing and closing timing of the intake valve 51 and the exhaust valve 52 are opened and closed in the above mentioned timing as indicated by the solid lines in FIG. 4.

In the engine 1 constructed as described above, in the second cold state which is for some time after the start of the engine 1, the valve mechanism 53 advances the opening timing of the intake valve 51 as compared with that in the hot state to thereby increase the amount of exhaust gas which is blown back into the intake port 32 due to a negative pressure of the intake port 32. Therefore, the flow of the exhaust gas which is blown back into the intake port 32 facilitates the atomization of fuel within the intake port 32 and the intake passage 35, and increases the temperature of the respective walls of the intake port 32 and the intake passage 35 to facilitate the carburetion of fuel. Specifically, since an air-fuel mixture can be combusted in a stable manner even in the second cold state for some time after the start of the engine 1, unburned components in the exhaust gas can be reduced. Also, since the exhaust gas including unburned components of fuel which increases in the last half of an exhaust stroke is blown back into the intake port 32 and combusted again, unburned components in exhaust gas can be further reduced.

Further, in the second cold state which is for some time after the start of the engine 1, the valve mechanism 53 retards the closing timing of the intake valve 51 to a timing after the bottom dead center of the piston 22, i.e., in the moving-up stroke of the piston 22 as compared with that in the hot state, and therefore, an air-fuel mixture which has been increased in temperature within the cylinder 21 is blown back into the intake port 32 and the intake passage 35. This facilitates the increase in the temperature of an air-fuel mixture which is taken in next, and the increase in the temperature of the respective walls of the intake port 32 and the intake passage 35 to facilitate the carburetion of fuel which is injected in the next cycle. Namely, since an air-fuel mixture can be combusted in a stable manner even in the second cold state, unburned components in exhaust gas can be reduced. It should be noted that in the hot state of the engine 1, if the closing timing of the intake valve 51 lies in a period of time for which an air-fuel mixture is blown back into the intake port 32, the amount of air-fuel mixture which is blown back is increased, and hence the same effects as described above can be obtained.

Further, since the valve mechanism 53 sets the opening timing of the exhaust valve 52 to a timing before the piston 22 reaches the bottom dead center irrespective of whether the engine 1 lies in the second cold state or in the hot state, the exhaust gas purifying catalyst 93 can be increased in temperature since combustion gas is emitted as exhaust gas at a high temperature. Therefore, the exhaust gas purifying catalyst 93 can be increased in temperature even when the engine 1 lies in the second cold state. Further, irrespective of whether the engine 1 lies in the second cold state or in the hot state, the valve mechanism 53 keeps the opening timing of the exhaust valve 52 substantially constant at the optimum timing earlier than a timing in which the piston 22 reaches the bottom dead center. Therefore, it is possible to prevent the advancement of the opening timing of the exhaust valve 52 from reducing the period of time for which an air-fuel mixture is combusted and prevent unburned components in exhaust gas from being increased. At the same time, it is possible to prevent the retard of the closing timing of the exhaust valve 52 from causing more combustion gas to be used for expansion to lower the temperature of exhaust gas, which inhibits a quick rise in the temperature of the exhaust gas purifying catalyst 93. Namely, since the opening timing of the exhaust valve 52 is kept constant at the optimum timing irrespective of whether the engine 1 lies in the cold state or in the hot state, unburned components in exhaust gas can be reduced.

Further, the valve mechanism 53 keeps the opening timing of the exhaust valve 52 substantially constant at the optimum timing irrespective of whether the engine 1 lies in the second cold state or in the hot state. Therefore, by the advancement of the closing timing of the exhaust valve 52, it is possible to prevent the amount of exhaust gas, which is blown back into the intake port 32 from reducing. At the same time, by the retard of the closing timing of the exhaust valve 52, it is possible to prevent the exhaust gas which does not contribute to atomization and carburetion of fuel from being excessively taken into the combustion chamber 31 to cause unstable combustion of an air-fuel mixture and increase unburned components in exhaust gas, and to prevent an early rise in the exhaust gas purifying catalyst 93 due to a decrease in the temperature of the exhaust gas. Namely, since the closing timing of the exhaust valve 52 is substantially kept constant at the optimum timing irrespective of whether the engine 1 lies in the second cold state or in the hot state, unburned components in exhaust gas can be reduced.

Further, in the second cold state which is for some time after the start of the engine 1, since the valve mechanism 53 advances the opening timing of the intake valve 51 to a timing earlier than the timing when the piston 22 reaches the top dead center, i.e., the upward moving stroke of the piston 22, the exhaust gas is blown back into the intake port 32 due to the negative pressure of the intake port 32 and the upward movement of the piston 22. Therefore, the amount of the exhaust gas which is blown back is increased to facilitate the atomization and carburetion of fuel.

Further, since the valve mechanism 53 includes the intake side rocker arm 6 and employs the screw type clearance adjusting mechanism 7, the opening timing of the intake valve 51 can be automatically advanced and the closing timing of the intake valve 51 can be automatically retarded in the second cold state which is for some time after the start of the engine 1.

Further, since the valve mechanism 53 includes the exhaust side rocker arm 62 and employs the hydraulic lash adjuster 8 to keep the valve clearance at substantially zero, the opening timing and the closing timing of the exhaust valve 52 can be automatically kept substantially constant irrespective of whether the engine 1 lies in the cold state or in the hot state.

It should be noted that in the valve mechanism 53 based on the SOHC method in which one camshaft 34 actuates the intake valve 51 and the exhaust valve 52, the overlap cannot be adjusted even by changing the phase of the camshaft 34. Therefore, such a construction that the screw type clearance adjusting mechanism 7 and the hydraulic lash adjuster 8 are provided on the exhaust side and on the exhaust side, respectively, is particularly effective for the valve mechanism 53 based on the SOHC method.

Further, in the engine 1 constructed as described above, the air-fuel ratio of an air-fuel mixture is made lean to increase the temperature of the exhaust gas, so that the exhaust gas purifying catalyst 93 is quickly increased in temperature. Therefore, even in the second cold state which is for some time after the start of the engine 1, unburned components in exhaust gas can be further reduced. In this case, since the air-fuel mixture can be combusted in a stable manner due to the above described construction, there is no possibility that the combustion of the air-fuel mixture becomes unstable even if the making-lean means which makes the combustion of an air-fuel mixture unstable is used.

Further, in the engine 1 constructed as described above, the air-fuel ratio of an air-fuel mixture is made lean to increase the temperature of the exhaust gas, so that the exhaust gas purifying catalyst 93 is quickly increased in temperature. Therefore, even in the second cold state which is for some time after the start of the engine 1, unburned components in the exhaust gas can be further reduced. In this case, since the air-fuel mixture can be combusted in a stable manner due to the above-described construction, there is no possibility that the combustion of the air-fuel mixture becomes unstable even if the retarding means which makes the combustion of an air-fuel mixture unstable is used.

Figure 5:
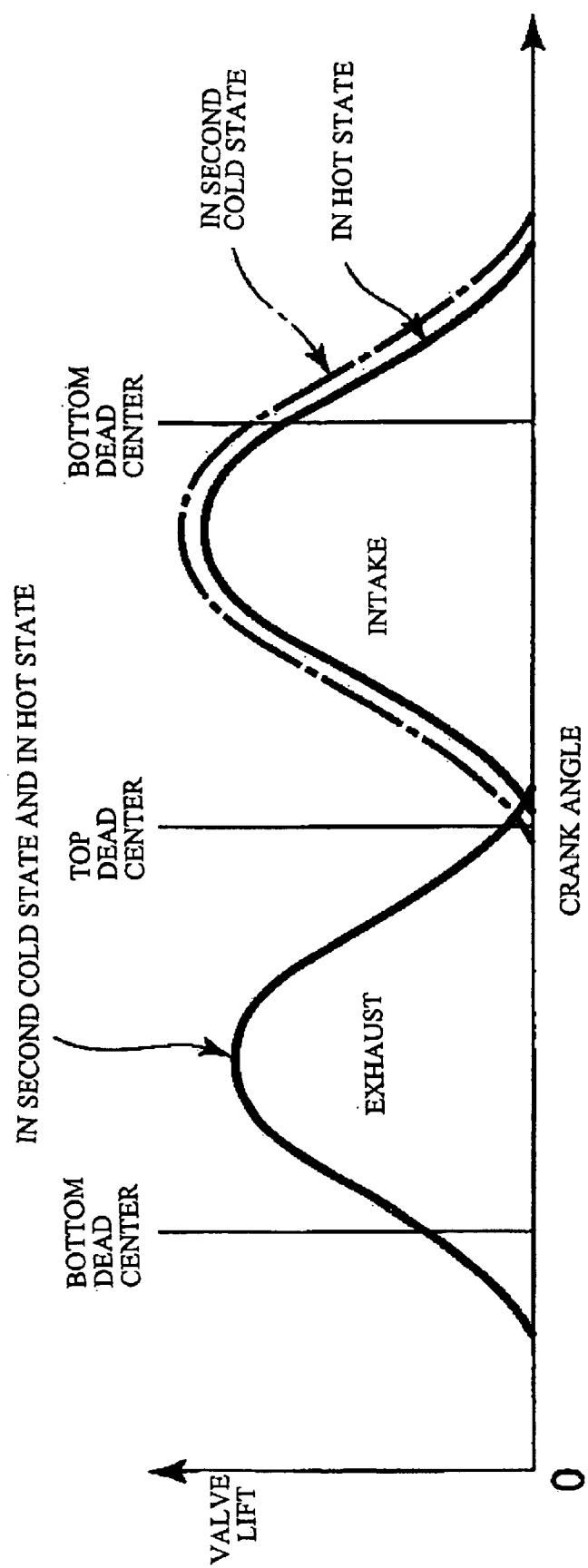
FIG. 5 is a time chart showing an opening timing and a closing timing of the intake valve and the exhaust valve according to the second embodiment.

A description will now be given of a second embodiment of the present invention with reference to FIG. 5. The second embodiment differs from the first embodiment in that the opening timing of the intake valve 51 in the hot state of the engine 1 is set to a timing which is retarded e.g., about 3 degrees in a crank angle relative to the top dead center of the piston 22, and the closing timing of the intake valve 51 in the hot state of the engine 1 is set to timing which is retarded e.g., about 63 degrees in the crank angle relative to the bottom dead center of the piston 22.

The valve clearances of the intake valve 51 and the exhaust valve 52 may be set to initial values, or may be the same as those in the first embodiment in the second cold state which is for some time after the start of the engine 1 or in the hot state of the engine 1. The opening timing and the closing timing of the exhaust valve 52 may be substantially the same as those in the first embodiment. Elements and parts corresponding to those of the first embodiment are denoted by the same reference numerals, and description thereof is omitted.

In the second cold state which is for some time after the start of the engine 1, the opening timing of the intake valve 51 is set to a timing which is advanced about 5 degrees in the crank angle as compared with that in the hot state, and is advanced about 2 degrees relative to the top dead center of the piston 22. Therefore, the exhaust gas is blown back into the intake port 32 due to the negative pressure of the intake port 32 and the upward movement of the piston 22, so that the same effects as in the first embodiment can be obtained. If the closing timing of the intake valve 51 is set to a timing which is retarded e.g., about 5 degrees in the crank angle as compared with that in the hot state, the amount of air-fuel mixture which is blown back into the intake port 32 is increased to obtain the same effects as in the first embodiment.

It should be noted that in the above described first and second embodiments, a gasoline engine is used as the engine 1, but a diesel engine may be used. Even if a diesel engine is used as the engine 1, the same effects as in the first and second embodiments can be obtained.

Further, the valve mechanism 53 of the engine 1 should not necessarily be based on the SOHC method, but may be based on, for example, the DOHC (Double Overhead Camshaft) method in which two camshafts 34 are used.

Further, the opening and closing timing of the intake valve 51 and the exhaust valve 52 in the hot state of the engine 1 are not limited to those in the first and second embodiments, but may be changed suitably for the engine 1 in which the valve system 5 is used. Also, the amount of advancement of the opening timing of the intake valve 51 and the amount of retard of the closing timing of the intake valve 51 in the second cold state of the engine 1 are not limited to those in the first and second embodiments, but may be changed suitably for the engine 1 in which the valve system 5 is used.

Further, although in the first and second embodiments, the screw type clearance adjusting mechanism 7 is used as the fixed type clearance adjusting mechanism so as to set the intake side valve clearance, the present invention is not limited to this, but for example, a shim type clearance adjusting mechanism using a shim for adjusting the valve clearance may be used.

Further, the valve mechanism 53 should not necessarily be the rocker type as in the first and second embodiments, but may be a direct acting type. In this case, as an intake side driving part, an inverted tappet provided with a shim type clearance adjusting mechanism which adjusts the valve clearance using a shim may be adopted in place of the intake side rocker arm 6, and as an exhaust side driving part, an inverted tappet provided with an automatic clearance adjusting mechanism may be adopted in place of the exhaust side rocker arm 62, so that both of these tappets on the intake side and on the exhaust side are actuated by respective cams 34a of camshafts 34 provided on the respective ones of the intake side and the exhaust side.

Further, the valve mechanism 53 should not necessarily be such a rocker arm type that substantially the respective centers of the intake side rocker arm 6 and the exhaust side rocker arm 62 are supported using the rocker shafts 61, but may be such a swing arm type that camshafts 34 are respectively provided on the intake side and on the exhaust side, and the intake side rocker arm 6 is activated by a cam 34a of the camshaft 34 on the intake side and the exhaust side rocker arm 62 is actuated by a cam 34a of the camshaft 34 with respective one ends of the intake side rocker arm 6 and the exhaust side rocker arm 62 being used as fulcrums and with the respective other ends thereof being used as valve side one ends which come into contact with the respective ones of the intake valve 51 and the exhaust valve 52.

What is claimed is:

1. An internal combustion engine, comprising:

a cylinder head;

an intake valve slidably supported by said cylinder head;

an exhaust valve slidably supported by said cylinder head;

a first clearance adjusting mechanism for actuating said intake valve, said first clearance adjusting mechanism, setting a first valve clearance when the engine is in a first state, where both said intake valve and said cylinder head are in a cold state, and changing a second valve clearance, when the engine is in a second state, where the engine transits from the cold state to a hot state, after a cold start of the engine, such that an open timing of said intake valve is advanced and a close timing of said intake valve is retarded; and a second clearance adjusting mechanism for actuating said exhaust valve, said second clearance adjusting mechanism opens and closes said exhaust valve at fixed predetermined timings regardless of a temperature of said exhaust valve and said cylinder head.

2. The internal combustion engine according to claim 1, wherein said second valve clearance is shorter than said first valve clearance.

3. The internal combustion engine according to claim 1, wherein said first clearance adjusting mechanism maintaining a third valve clearance, substantially the same as said first valve clearance, when the engine is in a third state, where the temperature of said intake valve and the temperature of said cylinder head are in the hot state, such that said intake valve closes at substantially the same timing as in the first state.

4. The internal combustion engine according to claim 3, wherein said first valve clearance reduces to said second valve clearance due to a thermal expansion of said intake valve, and said second valve clearance increases to said third valve clearance due to a thermal expansion of said cylinder head.

5. The internal combustion engine according to claim 1, wherein said first valve clearance reduces to said second valve clearance due to a thermal expansion of said intake valve, and said second valve clearance increases to said third valve clearance due to a thermal expansion of said cylinder head.

6. The internal combustion engine according to claim 5, wherein said first clearance adjusting mechanism is a fixed clearance adjusting mechanism which seta a valve clearance to a predetermined value other than zero, and said second clearance adjusting mechanism include a lash adjuster.

7. The internal combustion engine according to claim 1, wherein said first clearance adjusting mechanism opens said intake valve before a top dead center when the engine is in said second state.

8. The internal combustion engine according to claim 1, wherein a valve overlap period in said second state is longer than valve overlap periods in said first and third states.

9. The internal combustion engine according to engine 1, further comprising:

an exhaust gas purifying catalyst provided in an exhaust passage of the engine, which includes,
making-lean means for making an air-fuel ratio of an air-fuel mixture combusted in a combustion chamber lean when the internal combustion engine is in the second state.

10. The internal combustion engine 1 according to claim 1, further comprising:

an exhaust gas purifying catalyst provided in an exhaust passage of the engine, which includes,
retarding means for retarding an ignition timing of an air-fuel mixture combusted in a combustion chamber of the engine when the engine is in the second state.

* * * * *